Aug. 23, 1927.
H. W. O'DOWD
WATER HEATER
Filed May 23, 1924
1,639,748
3 Sheets-Sheet 1
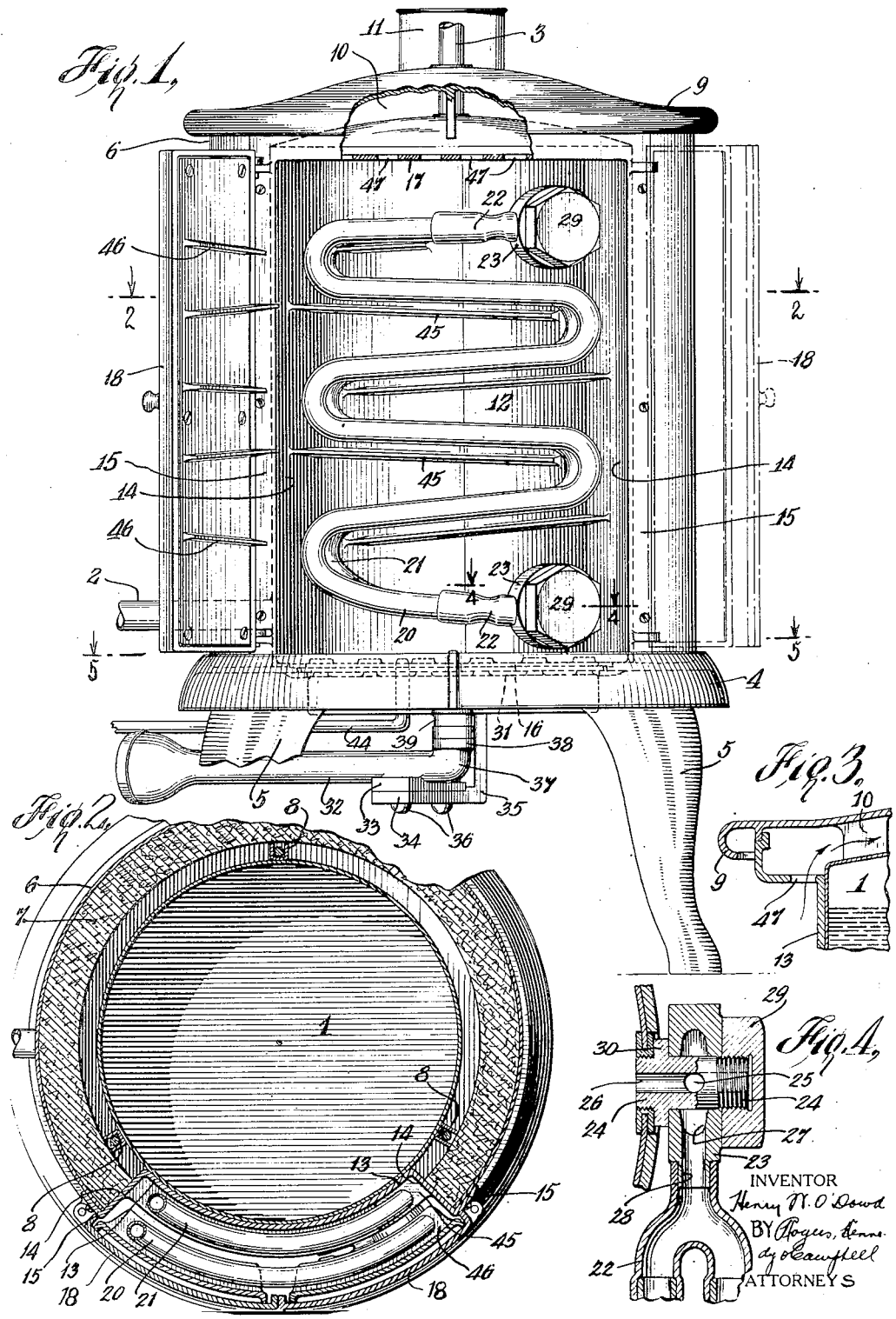

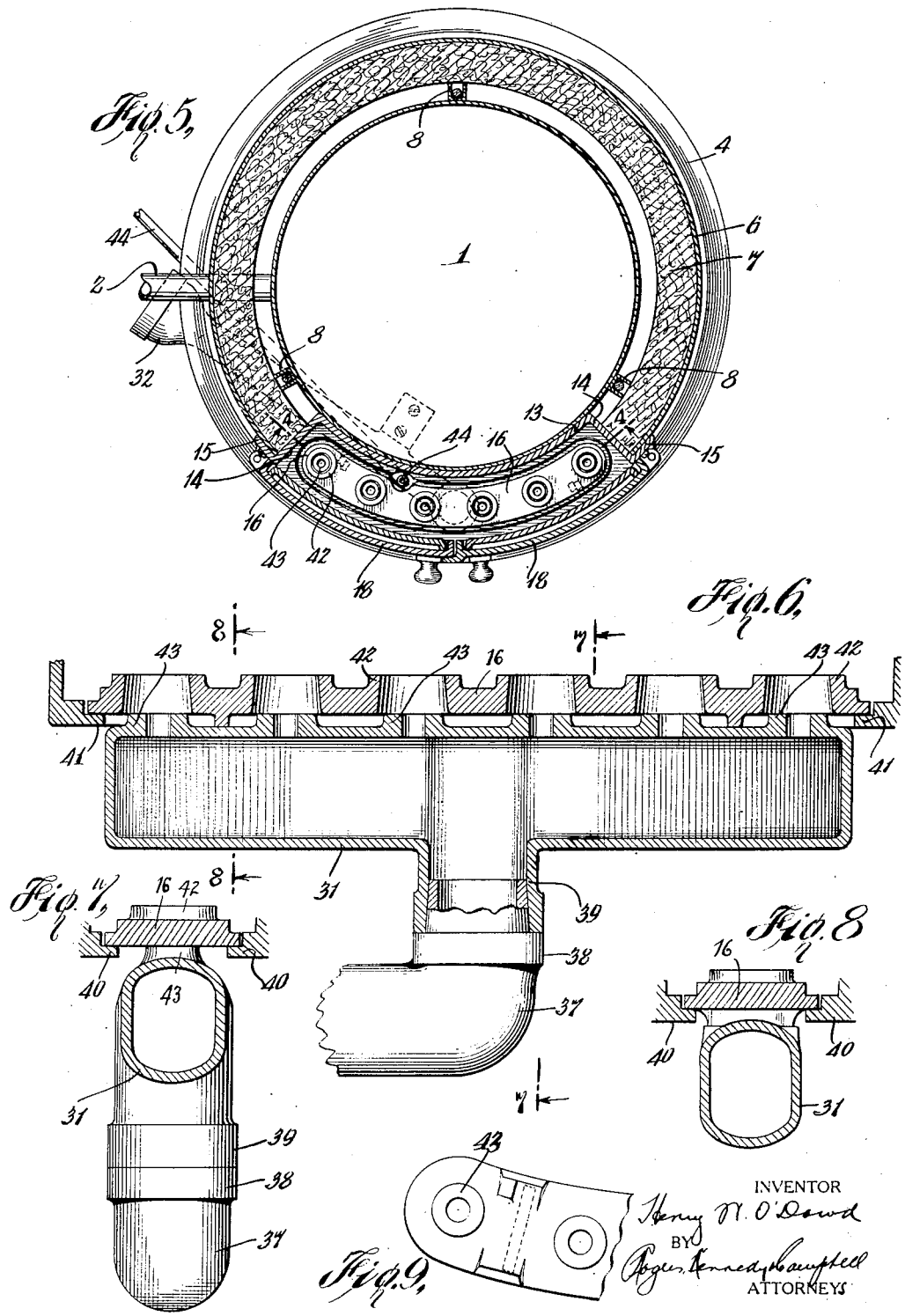

Aug. 23, 1927.
H. W. O'DOWD
1,639,748
WATER HEATER
Filed May 23, 1924
3 Sheets-Sheet 3
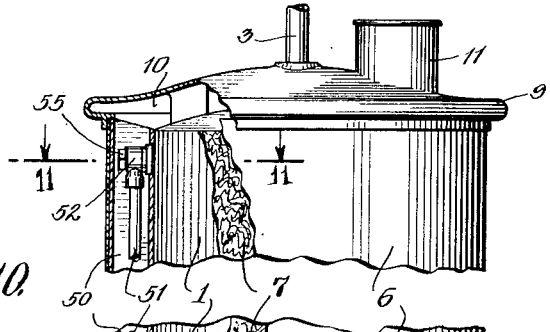
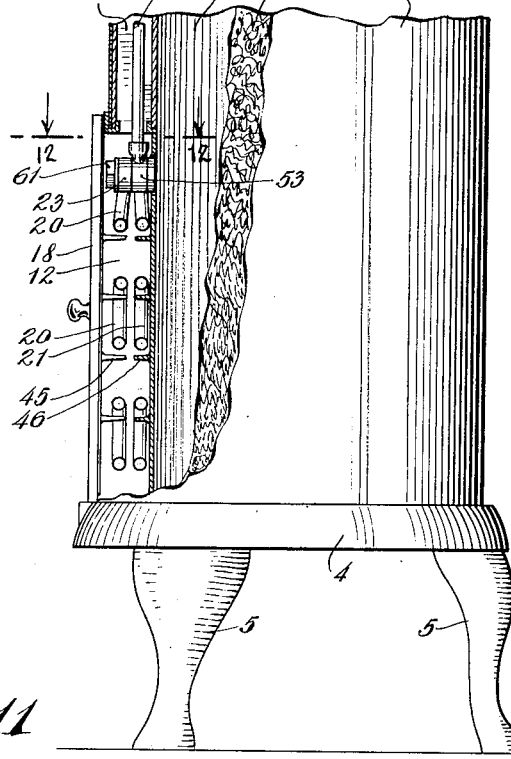
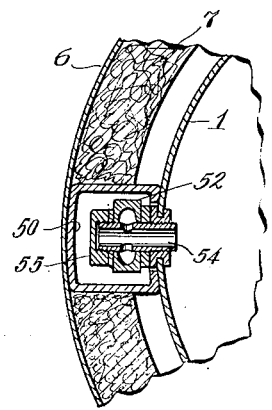
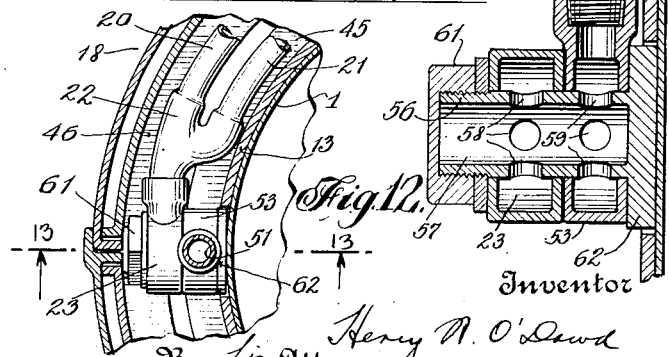
Inventor
Henry W. O'Dowd
By his Attorneys
Rogers, Kennedy & Campbell Patented Aug. 23, 1927.

1,639,748

UNITED STATES PATENT OFFICE.

HENRY W. O'DOWD, OF JERSEY CITY, NEW JERSEY, ASSIGNOR, BY MESNE ASSIGN-
MENTS, TO STANDARD GAS EQUIPMENT CORPORATION, OF BALTIMORE, MARY-
LAND, A CORPORATION OF MARYLAND.

WATER HEATER.

Application filed May 23, 1924. Serial No. 715,285.

This invention relates to water heaters, and while as to some of its features it may be embodied in constructions adapted for various purposes, it is more particularly applicable to water heaters of the circulating type.

The general objects of the invention are to provide a water heater which shall be simple, compact, and economical in construction, and highly efficient in operation, and whose parts shall be readily accessible and easily removable when necessary for purposes of cleaning, repair or replacement, etc. These and other objects will in part be obvious and in part be more fully set forth in the following description.

The invention consists in the novel parts, combinations, and features of construction herein shown and described.

Of the drawings:

Fig. 1 is a front view, parts being broken away, of a water heater constructed in accordance with the invention, the doors of the combustion chamber being shown as open, to expose the removable water circulating coil which constitutes an important feature;

Fig. 2 is a horziontal section taken on the line 2—2 of Fig. 1;

Fig. 3 is a fragmentary detail in cross section, showing a vent for the escape of the waste products from the combustion chamber;

Fig. 4 is a detail in cross section taken on the line 4—4 of Fig. 1 and showing the improved connection of the water circulating coil to the side of the storage tank;

Fig. 5 is a horizontal section taken on the line 5—5 of Fig. 1 and showing in particular the gas burner unit associated with the combustion chamber;

Fig. 6 is an enlarged view, mainly in vertical cross section, of the gas burner unit;

Fig. 7 is a section on the line 7—7 of Fig. 6;

Fig. 8 is a view taken on the line 8—8 of Fig. 6;

Fig. 9 is a plan view of a fragment of the floor plate of the combustion chamber;

Fig. 10 is a side elevation, partly in section, of a large size water heater constructed in accordance with the invention;

Fig. 11 is a section taken on the line 11—11 of Fig. 10;

Fig. 12 is a section taken on the line 12—12 of Fig. 10; and

Fig. 13 is a section taken on the line 13—13 of Fig. 12.

The embodiment illustrated in Figs. 1 to 9 will first be described.

As therein shown, the water heater comprises a storage tank 1, preferably of cylindrical shape. The cold water is supplied to the tank through a pipe 2 entering at its lower portion, and the heated water is drawn off from the tank through a discharge pipe 3 at the top. The tank is supported upon a base or stand 4 having conventional legs 5, two of which are shown in Fig. 1.

Surrounding the tank is an insulating jacket formed by a sheet metal casing 6, see Fig. 5, and an inner casing 7 made of some suitable heat resisting material, as asbestos. As shown, the insulating jacket is spaced from the water tank by means of channel irons 8, the air space therebetween affording an additional insulating medium which diminishes the loss of heat due to radiation. Surmounting and spaced from the top of the tank is a cover plate 9, the intervening space thus provided forming a flue 10 for the passage of the heated products of combustion issuing from the combustion chamber in a manner presently to be described, the said products finally escaping through a pipe 11 rising from the cover plate.

The insulating jacket is formed with a recess or space at one side, see Figs. 1, 2 and 5, in which recess is located a cast-iron fire-box 12 presenting a back wall 13 arranged in immediate contact with the side of the tank from top to bottom, side walls 14 with flanges 15, a bottom wall or floor plate 16, and a top wall 17, the latter being formed with vent openings 47 communicating directly with the flue space 10 (see Figs. 1 and 3). To permit ease of access to the interior heating or combustion chamber, the front wall of the fire-box is preferably composed of swinging doors 18, 18, hinged to the flanges 15 and which are so formed that when in closed position they preserve the cylindrical contour of the outside casing 6. It will thus be seen that the heating or combustion chamber is housed completely within the recess of the insulating jacket, which feature is not only desirable for the sake of economy and compactness, but in addition provides for the heating of the water in the tank by the direct radiation of heat from the combustion chamber.

The water circulating coil is enclosed within the above mentioned heating or combustion chamber and is connected to the side of the tank near the top and bottom thereof, directly from within said chamber. In the form shown, the coil (preferably made of copper) is a multiple S coil curved to conform to the outline of the tank and having front and rear portions 20 and 21 connected at opposite ends of the coil by double-branch elbow joints 22 to hollow flat-faced ring-like terminals 23 (see particlularly Fig. 4). These coil terminals 23 are fitted over nipples 24 screwed or otherwise inserted into the side of the storage tank, said nipples being formed with lateral orifices 25 which establish communication between the internal passages or bores 26 of the nipples and the annular chambers 27 of the coil terminals, the latter, as will be noted, having radial stem portions 28 which establish communication between the annular chambers 27 and the elbow joints 22. The coil terminals are held in place upon the nipples by means of clamping nuts 29 which clamp the terminals tightly between them and annular flanges 30 near the inner ends of the nipples, the contacting faces of the parts being ground or machined to make fluid-tight joints. It will now be evident that, when it is desired to remove the water circulating coil for any reason, it is simply necessary to unscrew the clamping nuts 29 from the nipples 24, when the terminals 23 may be slipped off the nipples and the entire coil removed laterally through the front of the heating chamber in a straight forward direction without endwise displacement. Similarly, in replacing the coil or substituting a new one, it is only necessary to slip the terminals over the nipples and screw up the clamping nuts. These connecting means, besides permitting the easy and quick removal of the water heating coil, are also useful in enabling the coil to be enclosed within the fire-box (which is comparatively shallow), and moreover provide for the direct connection of the coil to the side of the tank from within the heating chamber. By reason of this latter capability, the water is subjected to the direct heat within the combustion chamber throughout its circulation from and to the storage tank. As before stated, the water while in the tank also absorbs heat radiated from the combustion chamber owing to the contact existing between the fire-box and the side of the tank.

A Bunsen burner 31 for heating the water as it passes through the water circulating coil is located below the floor plate 16 of the combustion chamber and, like the coil, is curved longitudinally to conform to the shape of the tank, see Fig. 5. The burner is equipped with the customary mixing tube 32 provided with a plate 33 which rests on a flange 34 of a supporting bracket 35 secured to and depending from the base or stand 4. The plate 33 is detachably secured to the flange 34 by screws 36, which thus permit the mixing tube 32 to be removed, when desired. The mixing tube is provided with an upstanding tubular portion 37 having an integral flange 38, and the burner 31 is provided with a depending tubular portion 39 fitted snugly over the portion 37 and resting upon the flange 38, see Figs. 1 and 5. The burner 31, like the mixing tube 32, can thus be readily removed, when desired. The floor plate 16 is also removable, being loosely seated upon side flanges 40 and end flanges 41 at the bottom of the fire-box 12. In removing the burner, the floor plate is first lifted out of the fire-box and the burner then lifted up through the bottom of the box.

By reference to Fig. 6 in particular, it will be noted that the floor plate 16 is formed with a series of secondary air discharge nozzles 42 having their tapered openings arranged above and in centered relation to the burner orifices 43, so that when the burner is lighted, the flame jets are caused to project upwardly through the discharge nozzles, the idea being to provide for the proper entrainment of secondary air directly by the flame jets. As a matter of fact, the floor plate, as shown, is arranged to exclude air from the combustion chamber except through its discharge nozzles, and hence no air is allowed to enter the combustion chamber except that which is entrained by the flame jets in support of combustion, thus insuring the maximum heating efficiency of the burner and of the apparatus as a whole. It may be noted that in practice the operation of the burner will be controlled by a thermostatic element surrounded by the cold water pipe 2, but as such element forms no part of the present invention, it has not been shown herein. A permanent pilot burner 44 is associated with the Bunsen burner to light it whenever the gas is turned on.

Baffle plates 45 are cast on the back wall 13 of the fire-box 12 and similar plates 46 on the doors 18, 18, these baffle plates being longitudinally disposed between the convolutions of the water circulating coil, so that the heated products of combustion are directed upwardly in a tortuous path along each length of the coil portions 20 and 21, being finally evacuated through the vent openings 47 into the flue space 10 at the top of the tank. As shown in Fig. 2, the baffle plates, 45 and 46, do not meet at their inner edges, but are separated a slight distance to leave a vertical unbroken passage between the two coil portions for the burner flames. In this way, the heat energy of the products of combustion is utilized to the fullest extent, the flue space at the top of the tank affording a further source of heat for the water within the tank.

In the embodiment illustrated in Figs. 10 to 13, the invention has been shown as applied to a storage tank of greater height than that of the combustion chamber, it being the purpose to employ a combustion chamber and water circulating coil of standard size for all sizes of tanks. In the present instance, the fire-box 12 is precisely the same as above described except that it is provided with a flue extension 50 for connecting the combustion chamber 12 with the flue space 10 at the top of the storage tank. As will be noted, this flue section 50 is located in a corresponding recess formed in the insulating jacket and is arranged with its rear wall in contact with the side of the tank so as to radiate the heat of the ascending products of combustion directly to the tank. The water circulating coil is also precisely the same as before, except that, in this instance, it is connected to the upper portion of the tank by means of an extension pipe or riser 51 contained within the flue section 50, it being pointed out that the coil is connected directly to the lower portion of the tank in the same way as before. The extension pipe 51, like the coil, is provided at its opposite ends with hollow flat-faced ring-like terminals 52 and 53. The upper terminal 52 (Fig. 11) is fitted over a nipple 54 screwed into the tank and is held in place thereon by a clamping nut 55, these parts being like the coil coupling elements 23, 24 and 29 shown in Fig. 4. The lower pipe terminal 53 and the upper coil terminal 23 (Fig. 13) are both fitted over a blind or connecting nipple 56 having a central bore or chamber 57 and formed with two sets of lateral orifices 58 and 59, the former registering with the annular chamber 27 of the coil terminal 23, and the latter registering with the annular chamber 60 of the pipe terminal 53. A nut 61, screwed to the front end of the nipple 56, closes the chamber 57 at the front and serves to clamp the parts together in a fluid-tight manner up against an annular flange 62 on the rear end of the nipple. It will be seen, therefore that the water circulating coil may still be removed from the front of the combustion chamber with the same ease and facility as before, it being merely necessary to unscrew the clamping nut 29 at the bottom and the clamping nut 61 at the top, when the coil terminals may be slipped off their respective nipples to detach the coil. It will also be seen that, due to the location of the extension pipe 51 in the flue section 50, the water absorbs heat throughout its circulation from and to the storage tank, being heated directly by the burner flames while passing through the coil and by the hot products of combustion while passing through the extension pipe. Hence, in both embodiments, there is provided a water circulating pipe system completely enclosed within a housing within which heat is generated.

It will now be evident that a water heater constructed in accordance with the principles of the invention as shown and described will carry out the objects of the invention as enumerated besides possessing other advantages which will be apparent to those skilled in the art.

The invention in its broader aspects is not limited to the precise constructions shown and described, as many changes may be made in the details thereof without departing from the main principles of the invention or sacrificing its chief advantages. For instance, it is not essential that the heating chamber be a combustion chamber, as the invention contemplates the employment of heating units other than gas burners and such for example as electrical appliances. These and various other modifications will readily suggest themselves to those skilled in the art.

I claim:

1. A water heater including in combination a cylindrical storage tank, a cylindrical casing surrounding and spaced from said tank and formed in one side with a recess constituting a shallow segmentally-shaped combustion chamber, a cover for said chamber forming a curved continuation of the casing, a water circulating coil arranged in said chamber and contained wholly within the cylindrical contour of the casing and communicating at its ends with the interior of the tank, and means for generating heat in said chamber.

2. A water heater including in combination a cylindrical storage tank, a cylindrical casing surrounding and spaced from said tank, and formed in one side with a recess constituting a shallow segmentally-shaped combustion chamber, a cover for said chamber forming a curved continuation of the casing, a water circulating coil arranged in said chamber and communicating at its opposite ends with the interior of the tank, said coil being curved to conform to the outline of the tank and to the contour of the cover so as to be contained wholly within the cylindrical contour of the casing, and means for generating heat in said chamber.

3. A water heater including in combination a storage tank, a casing surrounding the tank and formed in one side with a recess constituting a shallow combustion chamber, a movable cover plate for said recess, a water circulating coil arranged in said casing, and means for detachably connecting said coil with the tank, said means including a pair of hollow nipples communicating with the interior of the tank and projecting horizontally from the side of the same, hollow coil terminals fitted over the nipples and communicating with the interior of the same, and releasable means for holding the parts together in fluid tight condition; whereby the coil may be removed from the combustion chamber by a straight horizontal direct movement.

4. A water heater including in combination a storage tank, a casing surrounding said tank and formed with a recess therein, said recess constituting a shallow combustion chamber, a cover for said chamber substantially flush with and forming part of said casing, a water circulating coil arranged in and curved to conform with said chamber and connected to the tank at its opposite ends, a burner located at the lower end of the combustion chamber for heating said coil, and baffle plates arranged in said chamber between the convolutions of said coil.

5. A water heater including in combination a storage tank, a casing surrounding said tank and formed with a recess therein, said recess constituting a shallow combustion chamber, a cover for said chamber substantially flush with and forming part of said casing, a water circulating coil arranged in and curved to conform with said chamber and connected to the tank at its opposite ends, a burner located at the lower end of the combustion chamber for heating said coil, and baffle plates arranged on the front and rear walls of said chamber between the convolutions of said coil and with a vertical space between the front and rear plates.

6. A water heater including in combination a storage tank, a casing surrounding said tank and formed with a recess therein, said recess constituting a shallow combustion chamber, a cover for said chamber substantially flush with and forming part of said casing, a water circulating coil arranged in said chamber and connected to the tank at its opposite ends, a burner plate forming the floor of said chamber and formed with a series of secondary air discharge openings, and a Bunsen burner supported below the floor plate and having its gas orifices arranged to project the flame jets upwardly through the secondary air discharge openings.

7. A water heater including in combination a storage tank, a casing surrounding said tank and formed with a recess therein, said recess constituting a shallow combustion chamber, a movable cover for said recess substantially flush with and forming part of said casing, a water circulating coil arranged in said chamber and detachably connected to the tank so as to be removable laterally from the front of the heating chamber, a floor plate for the combustion chamber also removable from the front thereof and formed with a series of secondary air discharge openings and a Bunsen burner supported below the floor plate and having its gas orifices arranged to direct the flame jets upwardly through the secondary air discharge openings, said burner being likewise removable from the front of the combustion chamber after the removal of the floor plate.

8. A water heater including in combination a storage tank, a casing surrounding said tank and formed with a recess therein, said recess constituting a shallow combustion chamber, a movable cover for said recess substantially flush with and forming part of said casing, a water circulating coil arranged in said chamber, and means for detachably connecting said coil to the tank, the said means including a pair of flat nipples communicating with the tank and having lateral orifices, hollow flat ring-like coil terminals fitted over said nipples and communicating with the lateral orifices, and clamping nuts screwed to the outer ends of the nipples for holding the parts together in a fluid-tight condition.

In testimony whereof, I have affixed my signature hereto.

HENRY W. O'DOWD.